US012398972B1

United States Patent
Buckler et al.

(10) Patent No.: US 12,398,972 B1
(45) Date of Patent: Aug. 26, 2025

(54) REMOTE OPERATED GUN BREECH

(71) Applicants: Matthew Thomas Buckler, Fredericksburg, VA (US); Timothy Gerald Burcham, Fredericksburg, VA (US); Yui Jean Clifford, Stafford, VA (US); Thomas Klebert Houck, Jr., Woodford, VA (US); Jonathan Edward Scroggins, Fredericksburg, VA (US); Annette Christine Straziuso, Fredericksburg, VA (US)

(72) Inventors: Matthew Thomas Buckler, Fredericksburg, VA (US); Timothy Gerald Burcham, Fredericksburg, VA (US); Yui Jean Clifford, Stafford, VA (US); Thomas Klebert Houck, Jr., Woodford, VA (US); Jonathan Edward Scroggins, Fredericksburg, VA (US); Annette Christine Straziuso, Fredericksburg, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 18/794,165

(22) Filed: Aug. 5, 2024

Related U.S. Application Data

(63) Continuation-in-part of application No. 18/211,763, filed on Jun. 20, 2023, now Pat. No. 12,139,273.

(51) Int. Cl.
*F41A 25/16* (2006.01)
*B64D 7/02* (2006.01)

(52) U.S. Cl.
CPC ............... *F41A 25/16* (2013.01); *B64D 7/02* (2013.01)

(58) Field of Classification Search
CPC ...... F41A 3/10; F41A 3/44; F41A 9/46; F41A 25/16
USPC .......................................... 89/23, 24, 37.01
See application file for complete search history.

(56) References Cited

U.S. PATENT DOCUMENTS 2,877,690 A * 3/1959 Barr ....................... F41A 25/02
89/43.01

FOREIGN PATENT DOCUMENTS

GB 2327115 A * 1/1999 ................ F41A 3/72

\* cited by examiner

*Primary Examiner* — Bret Hayes
(74) *Attorney, Agent, or Firm* — Gerhard W. Thielman

(57) ABSTRACT

A remote operated mechanism is provided for raising and lowering a seal in a gun loader breech via a transfer gear. The mechanism includes a servo motor, a pinion, a clutch and a worm gear. The servo motor axially rotates the pinion. The clutch controllably engages and disengages with the pinion. The worm gear couples the clutch to a shaft that engages the transfer gear. The clutch disengages the pinion from the motor in response to recoil from firing the gun. The worm gear includes a worm screw that axially turns with the pinion and a worm wheel that engages the worm screw to laterally spin a shaft connected to the transfer gear. The clutch includes a coupler for engaging the worm screw, a spur gear that connects the coupler to the pinion, and a spring that pushes the coupler to engage the worm screw prior to firing.

5 Claims, 16 Drawing Sheets

REMOTE OPERATED GUN BREECH

CROSS REFERENCE TO RELATED APPLICATION

The invention is a Continuation-in-Part, claims priority to and incorporates by reference in its entirety U.S. patent application Ser. No. 18/211,763 filed Jun. 20, 2023 and assigned Navy Case 210332.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to breech loaders for guns. In particular the invention relates to breech operation by remote control for a 105-mm gun used in cargo-carrying derivative aircraft.

The 105 mm Gun Aircraft Unit (GAU) is an aerial gun system having a recoil mechanism and cradle integrated into a Trainable Gun Mount (TGM). The 105 mm GAU was designed specifically for integration into large aircraft (e.g., Lockheed AC-130H Spectre gunships) that perform ground support missions. The functional purpose of the GAU is to enable the aircraft to align to a target and fire artillery rounds at depressed angles while in flight.

Prior to the exemplary 105 mm GAU, a special operation command for the U.S. Air Force relied on a modified cradle from the U.S. Army's M102 Howitzer along with the M37A1 recoil mechanism. The original design of the cradle and recoil mechanism was intended for use with a field artillery gun. This design has been adapted to aerial applications with select modifications, although various suboptimal constraints remain. This includes for example, the loader breech opens and closes via a manual crank.

SUMMARY

Conventional breech loaders on aircraft guns yield disadvantages addressed by various exemplary embodiments of the present invention. In particular, various exemplary embodiments provide a remote operated mechanism for raising and lowering a seal in a gun loader breech via a transfer gear. The mechanism includes a servo motor, a pinion, a clutch and a worm gear. The servo motor axially rotates the pinion. The clutch controllably engages and disengages with the pinion. The worm gear couples the clutch to a shaft that turns the transfer gear. The clutch disengages the pinion from the motor in response to recoil from firing the gun.

In other various or additional embodiments, the worm gear includes a worm screw that axially turns with the pinion and a worm wheel that engages the worm screw to laterally spin a shaft connected to the transfer gear. The clutch includes a coupler for engaging the worm screw, a spur gear that connects the coupler to the pinion, and a spring that pushes the coupler to engage the worm screw prior to firing.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in meters (m) or inches ("), mass in grams (g) or pounds-mass (lbm), time in seconds(s), angles in degrees (°), and force in newtons (N) or pounds-force (lbf). Supplemental measures can be derived from these, such as pressure in pounds-per-square-inch (psi), moment of inertia in gram-square-centimeters (kg-m$^2$) and the like.

Figure 1:
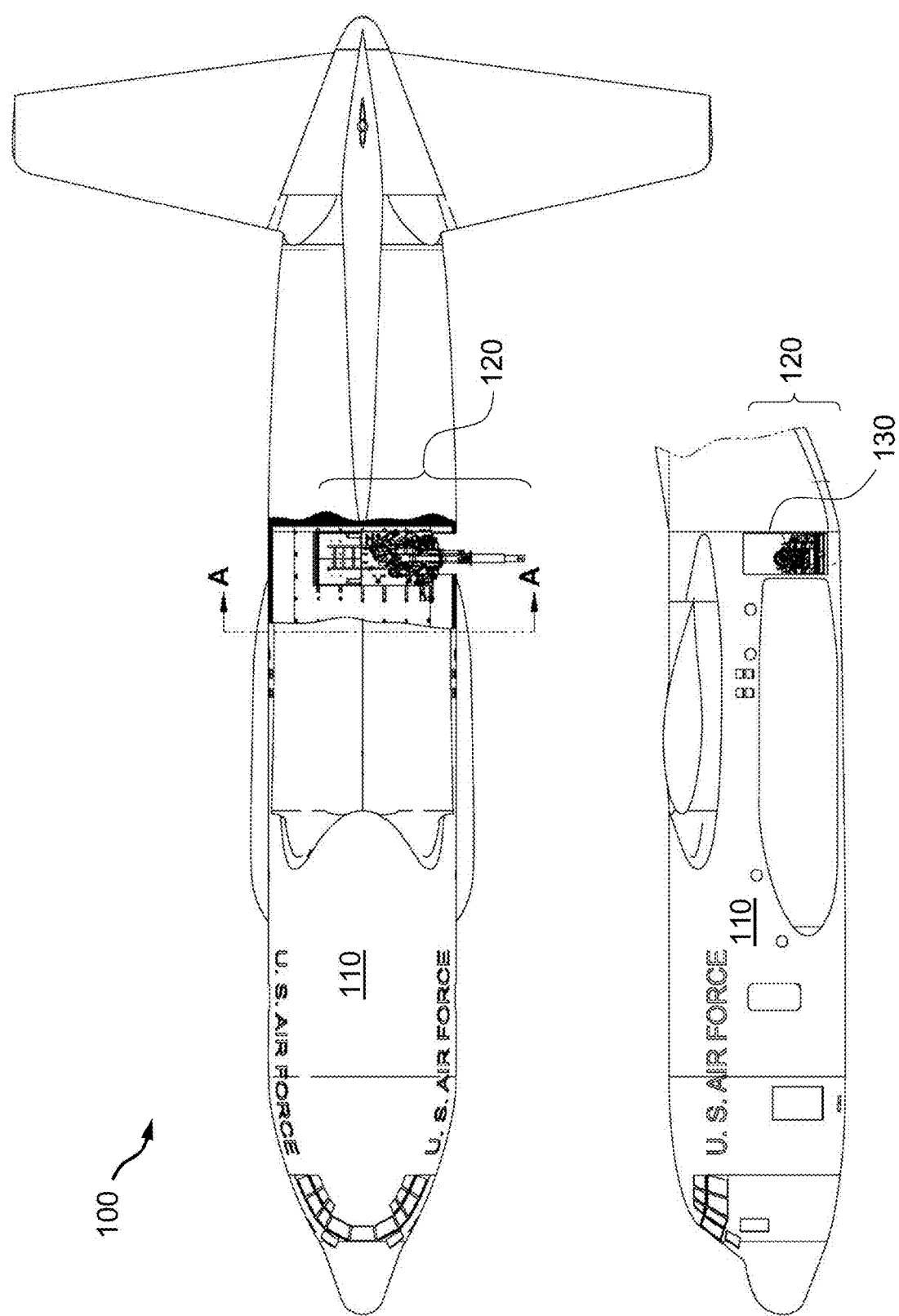
FIG. 1 is an elevation and plan view of an AC-130 aircraft with an exemplary 105 mm Gun Aircraft Unit (GAU) with Trainable Gun Mount (TGM)

FIG. 1 shows elevation views 100 of an AC-130 aircraft 110 as operated by the U.S. Air Force. An exemplary gun system 120 for a 105 mm Gun Aircraft Unit (210 in FIG. 2) is disposed on a trainable gun mount atop the floor of the aircraft 110 to point laterally outward through a door hatch 130. Section A-A points aft. Exemplary embodiments provide an exemplary operational kit for opening and closing the breech for the GAU 210 although such configurations can be applied to alternative gun systems.

Figure 2:
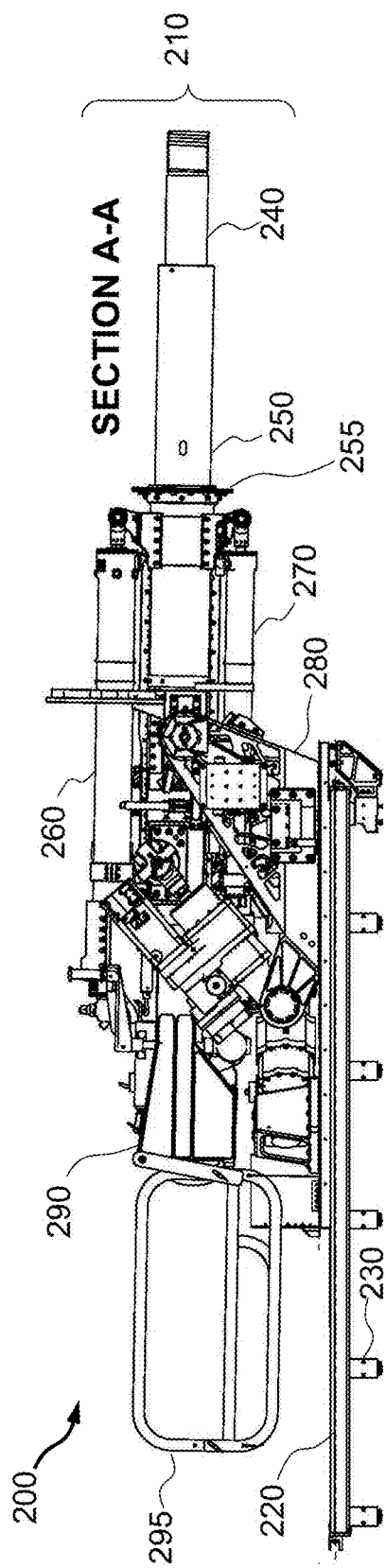
FIG. 2 is an elevation view of the 105 mm GAU.

FIG. 2 shows an elevation view 200 of the 105 mm Gun Aircraft Unit (GAU) 210 for the gun system 120 along Section A-A disposed on a pallet 220 supported by rails 230 on the floor of the aircraft 110. The 105 mm GAU 210 includes a gun tube 240 within a recoil sleeve 250 that connects to an annular flange 255.

Recoil can be mitigated by a brake assembly 260 and a pneumatic spring assembly 270 that flank the recoil sleeve 250 from above and below the gun tube 240. Elevation actuator brackets 280 are disposed above the pallet 220 and flank the 105 mm GAU 210. Fence arms 290 trailed by corresponding safety cages 295 straddle aft of the 105 mm GAU 210 to protect operators from recoil during gun fire. At the rear is an M102 manually operated breech for loading the 105 mm GAU 210.

Figure 3A:
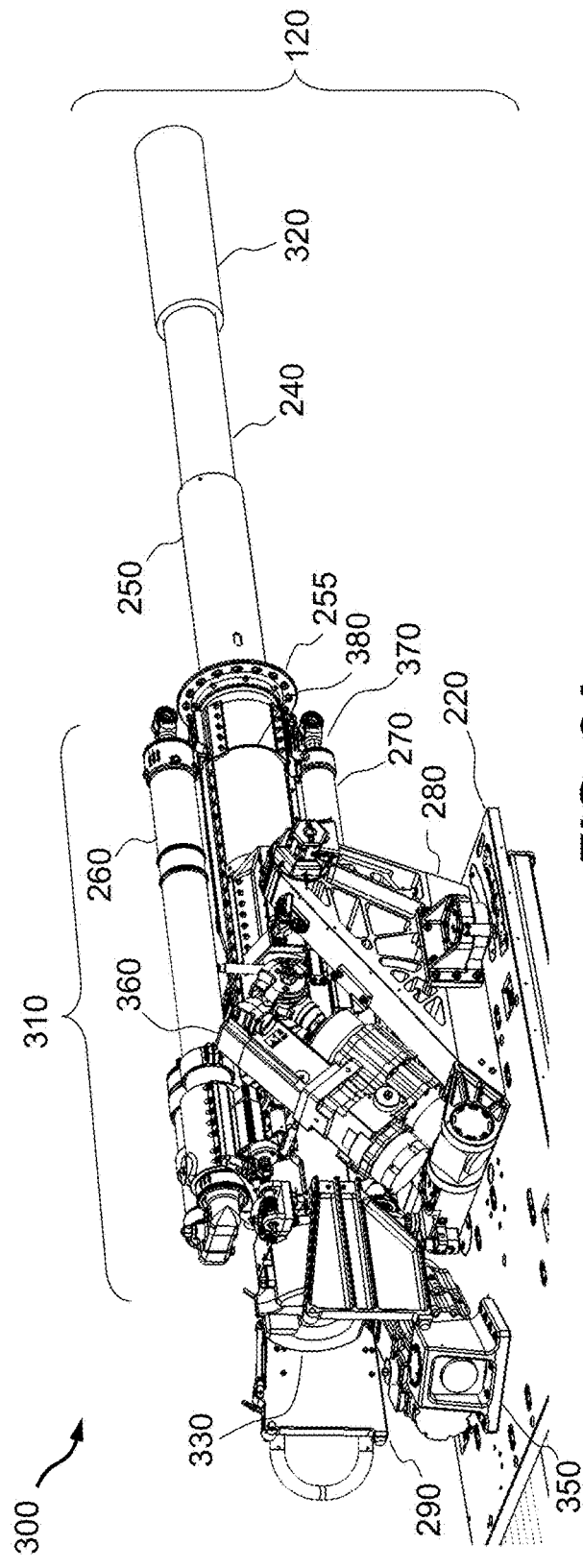
FIGS. 3A and 3B are isometric views of the 105 mm GAU.

FIG. 3A shows a perspective view 300 of the gun system 120. A recoil cradle 310 includes the brake and spring assemblies 260 and 270 to mitigate recoil. A diffuser 320 attaches to the barrel 240 at its muzzle end. A modified M102 breech 330 terminates the 105 mm GAU 210 opposite the diffuser 320. Floor trunnions 340 support the brackets 280 on the pallet 220.

An azimuth actuator 350 on an actuator bracket enables the 105 mm GAU 210 to yaw for engaging ground targets. An elevation actuator 360 disposed on the starboard bracket 280 pivots trunnions 370 to pitch a cradle tube 380 that constitutes the main structure of the cradle 310 in elevation. This enables the 105 mm GAU 210 to rise or depress in relation to the aircraft 110.

Figure 3B:
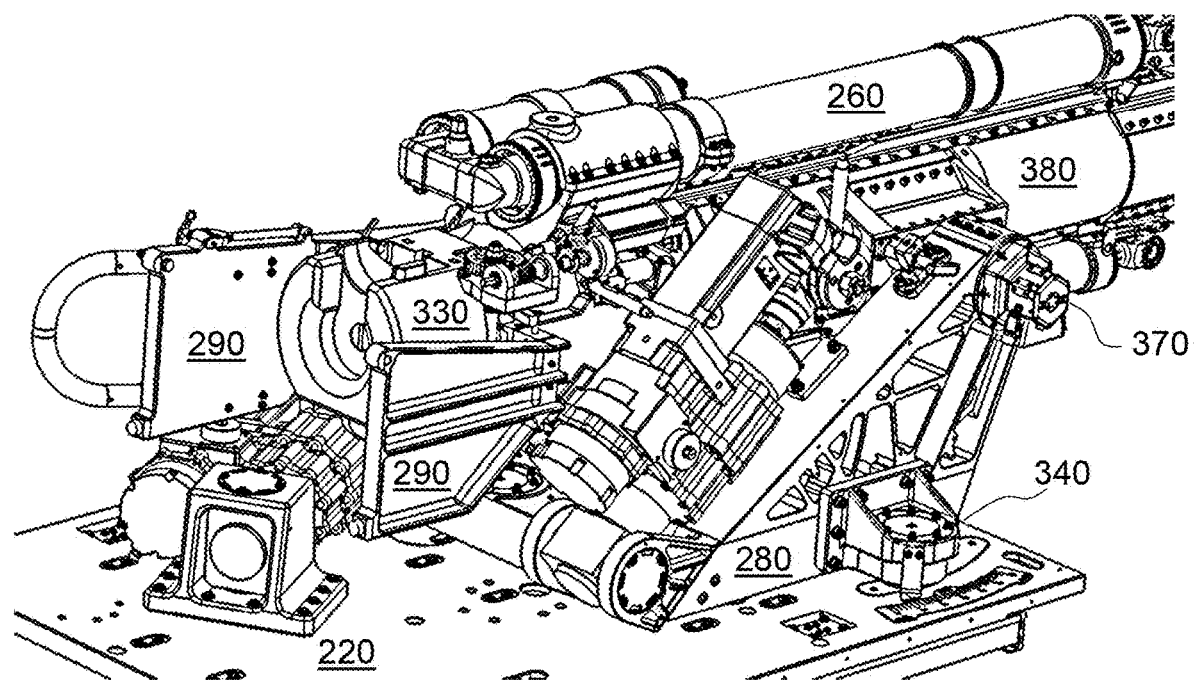
Figure 3C:
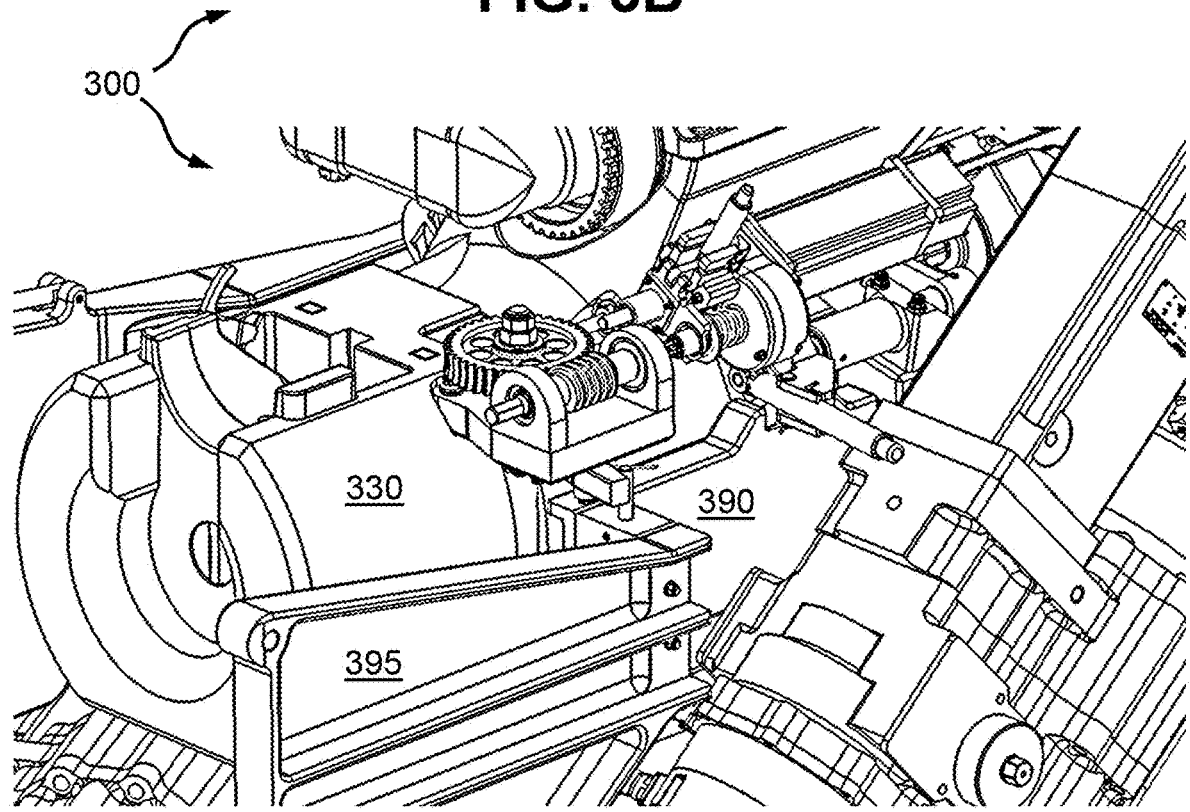
FIG. 3C is an isometric detail view of the GAU aft section.

FIGS. 3B and 3C show detail perspective views 300 of the aft portion of the gun system 120. The fence arms 290 include a fore mount flange 390 and an aft cage arm 395.

Figure 4:
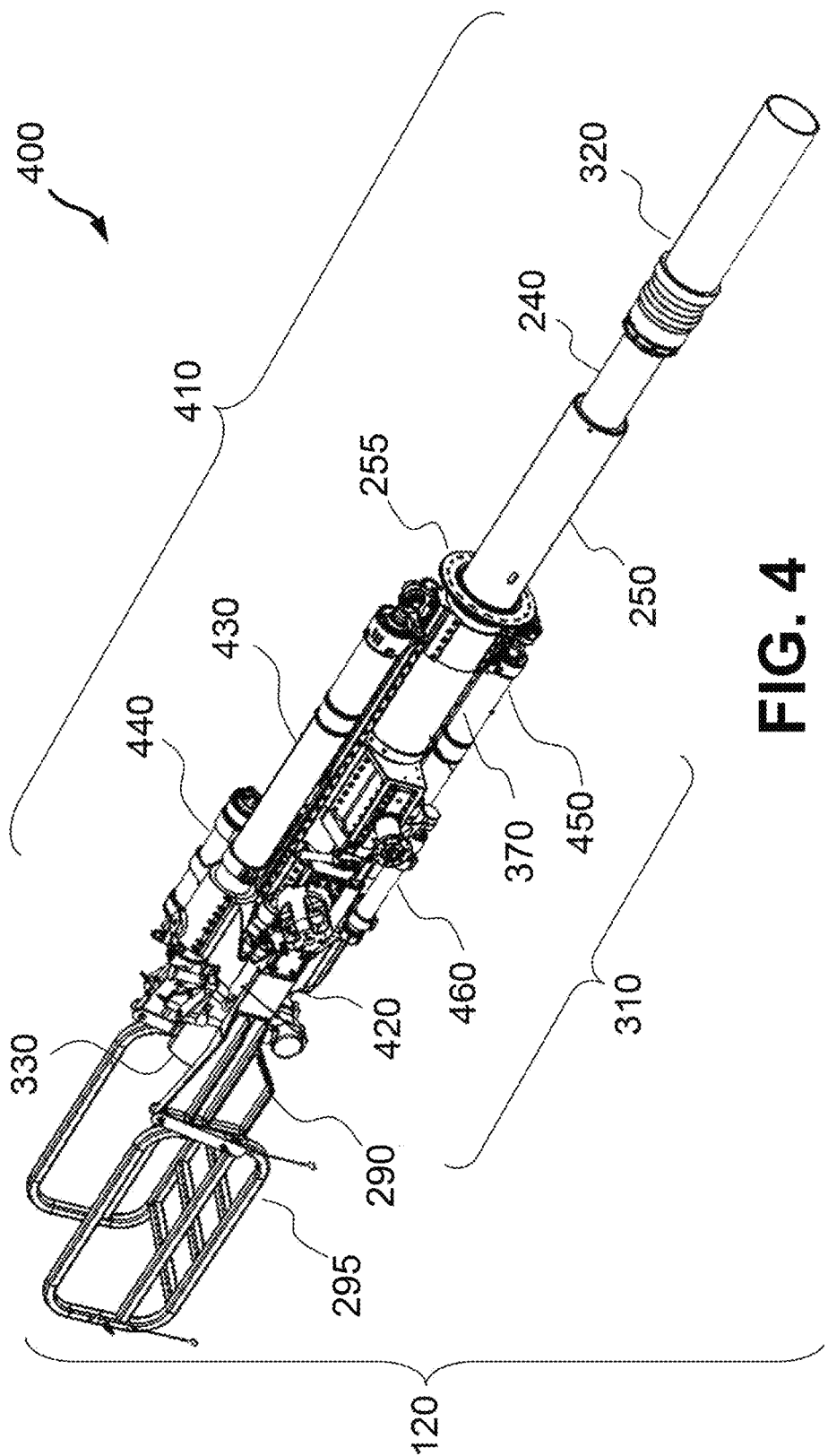
FIG. 4 is an isometric assembly view of GAU recoil components.

FIG. 4 shows an assembly view 400 of a 105 mm GAU 210 from the (proximal) muzzle end. A barrel recoiling assembly 410 is subdivided into two major sub-assemblies: the gun cradle 310 and the recoil mechanisms comprising the brake and spring assemblies 260 and 270 together with the gun tube 240 and recoil sleeve 250.

Identified components include breech nut 420, hydraulic brake cylinder 430, replenish cylinder 440, pneumatic spring cylinder 450, external counter-recoil buffers 460, annular flange 255, blast diffuser 320, safety cage arms 290 and safety cage 295. These cylinders 430, 440 and 450 are hollow.

Figure 5:
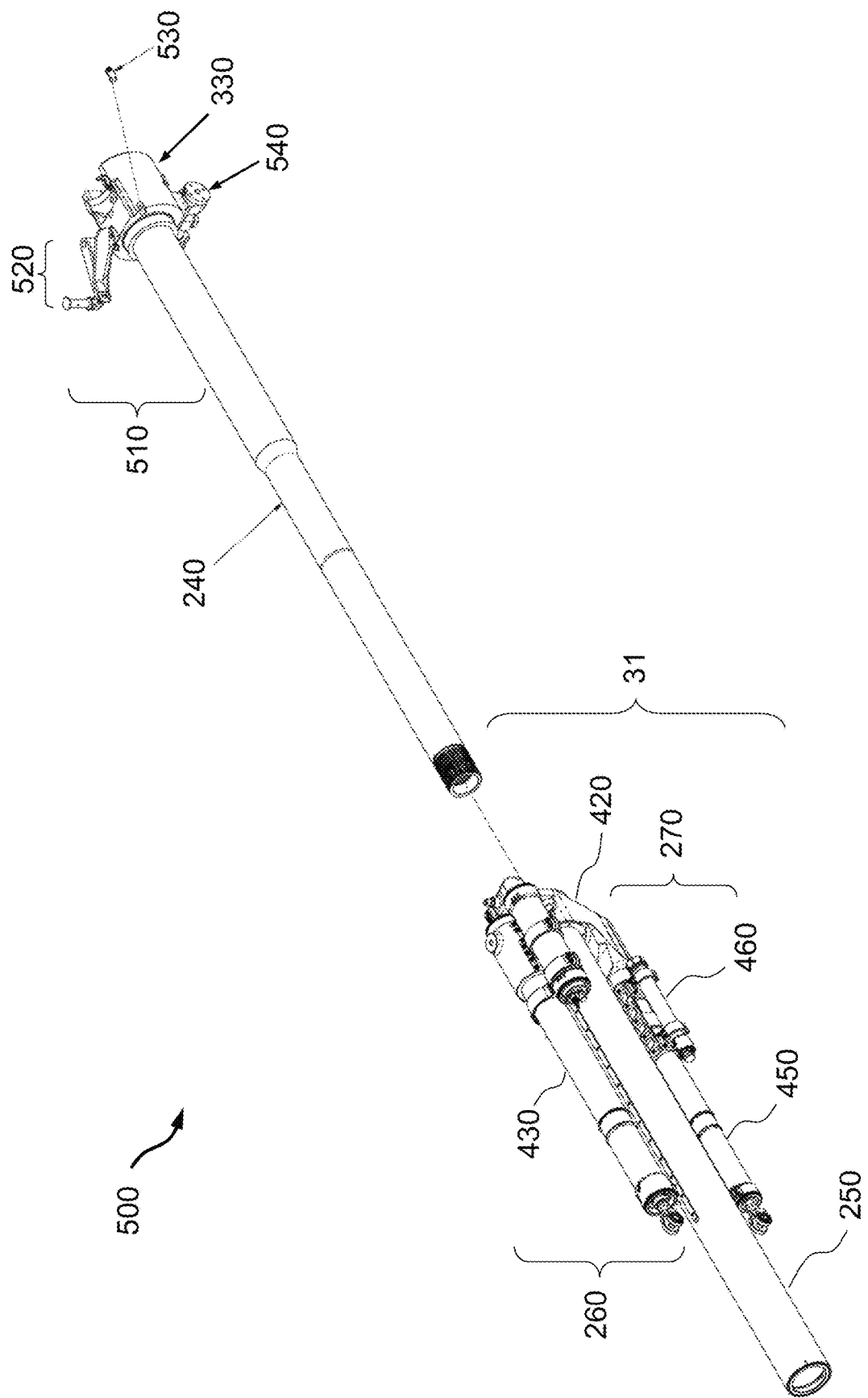
FIG. 5 is an isometric exploded view of the GAU.

FIG. 5 shows an isometric exploded view 500 of the 105 mm GAU 210, including the recoiling assembly 310 and a manual breech assembly 510. The recoil mechanism 310 includes the brake assembly 260 with brake cylinder 430 and replenish cylinder 440, as well as the pneumatic spring assembly 270 with pneumatic spring cylinder 450 and a pair of counter-recoil buffers 460. The manual breech assembly 510 includes the breech 330, a crank mechanism 520, a key 530 and a transfer cam 540.

The breech nut 420 attaches to the gun tube 240 and breech 330 to the recoil cradle 310. The handle 520 opens the breech and key 530 locks the breech 330 to the recoil cradle 310. Views 400 and 500 present components described more fully in the '763 application as ancillary components of the GAU 210. By contrast, the present disclosure relates primarily to actuation of the breech 330.

In comparison with the '763 application, select components are assigned different drawing labels with the prior disclosure in parentheses. These include: annular flange 255 (670), fence arm 290 (470), safety cage 295 (480), diffuser 320 (420), breech 330 (590), azimuth actuator 350 (550), elevation actuator 360 (560), cradle tube 380 (710), breech nut 420 (620), hydraulic brake cylinder 430 (630), replenish cylinder 440 (640), pneumatic spring cylinder 450 (650), external counter-recoil buffers 460 (660), handle 520 (1120), key 530 (1130) and breech cam 540 (680).

Figure 6A:
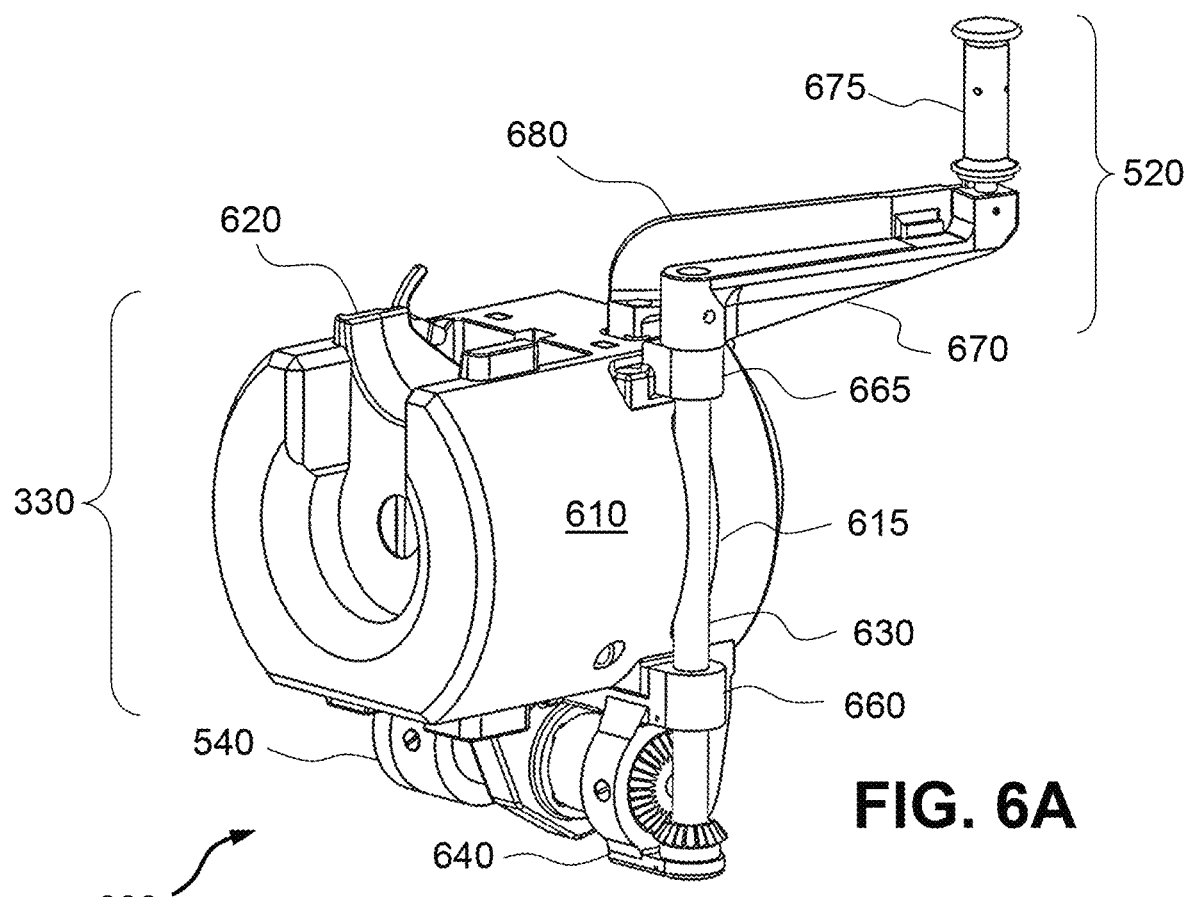
FIGS. 6A and 6B are isometric assembly views of a manually actuated breech.
Figure 6B:
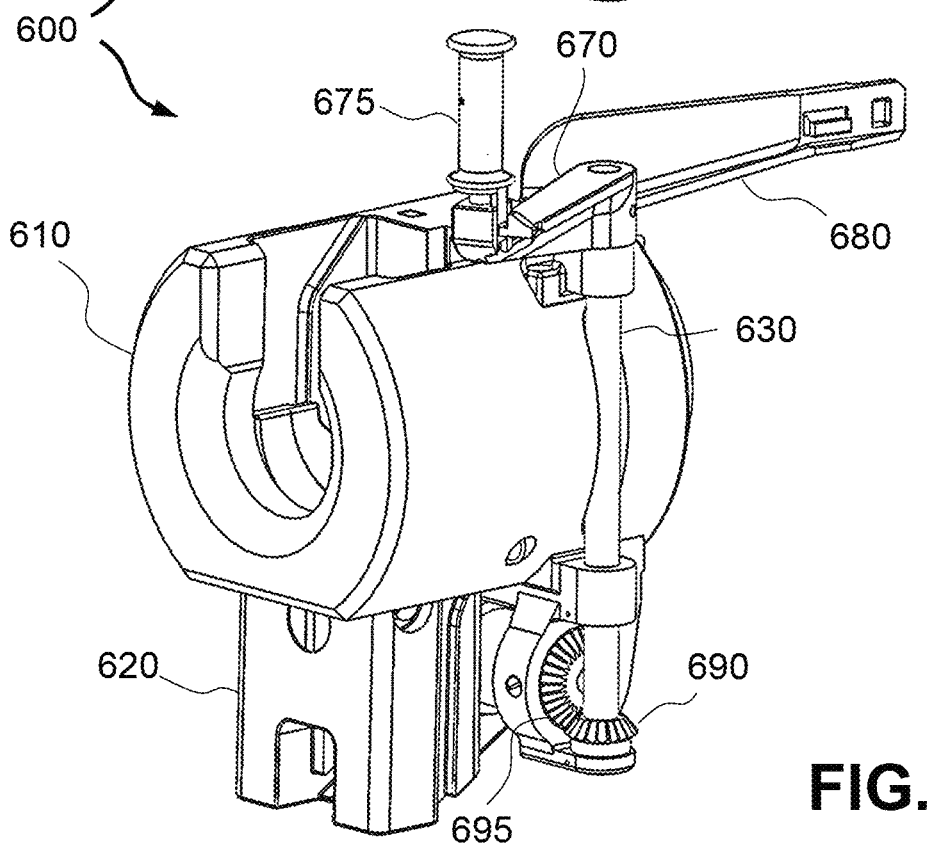
Figure 6C:
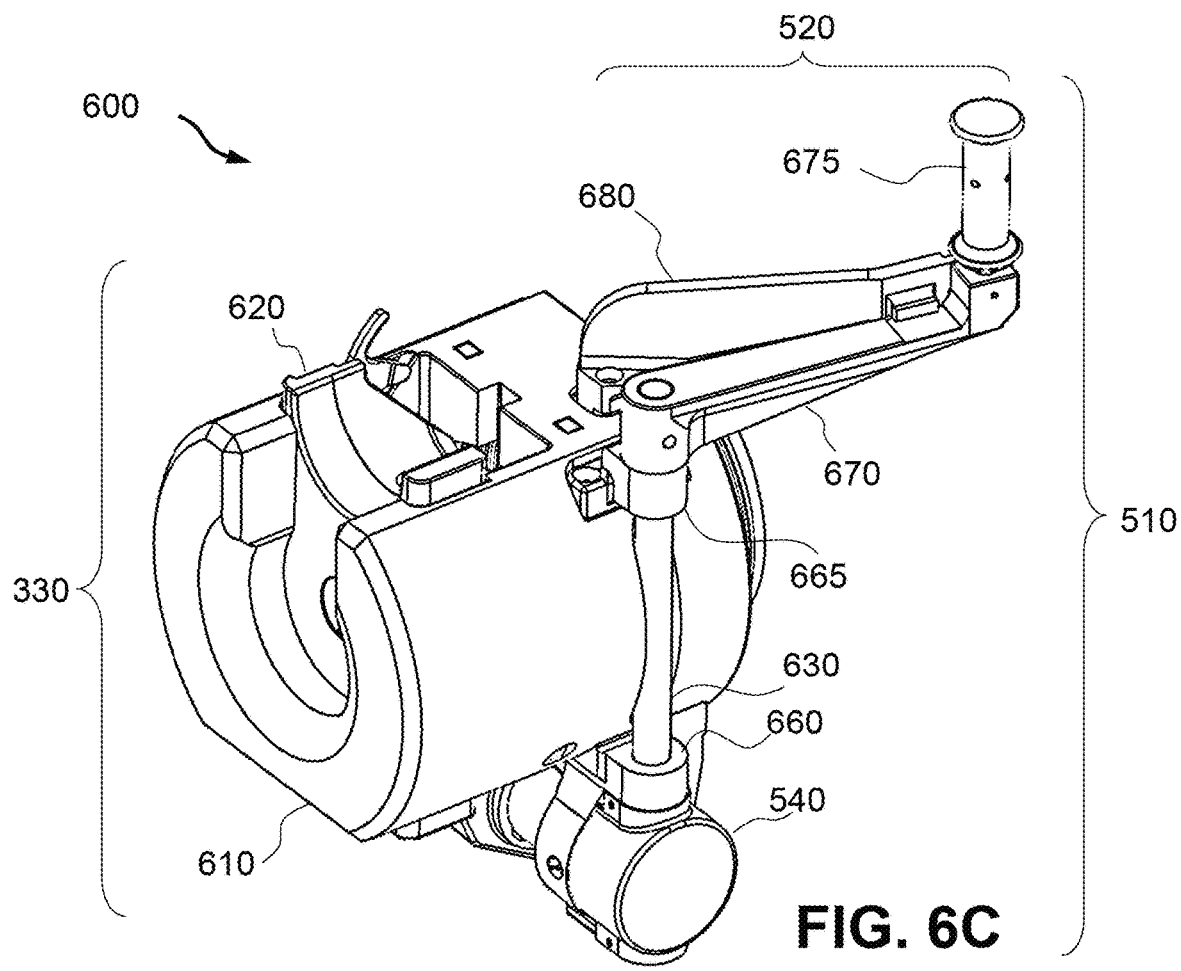
FIG. 6C is an isometric assembly view of the manual breech.

FIGS. 6A and 6B show assembly views 600 of closed and open dispositions of the breech 330 under manual operation. FIG. 6C shows a supplemental assembly view 600 with the breech 330 closed. The breech 330 includes a housing 610 with a channel slot 615 and a sliding seal 620 that closes or opens the breech 330 by respectively raising or lowering within the housing 610. A drive shaft 630 along the slot 615 operates a bevel gear transmission 640 within the transfer cam 540 to raise or lower the seal 620.

Lower and upper hinges 650 and 660 on the housing 610 support the shaft 630, which connects to a turn arm 670 operated by a handle 675. Turning the arm 670 clockwise from above pivots a coupler 680 that causes the seal 620 to rise or descend within the housing 610. The transmission 640 includes a bottom bevel gear 690 responsive to the shaft 630 and an adjoining side bevel gear 695 that turns along the cam 540.

Figure 7A:
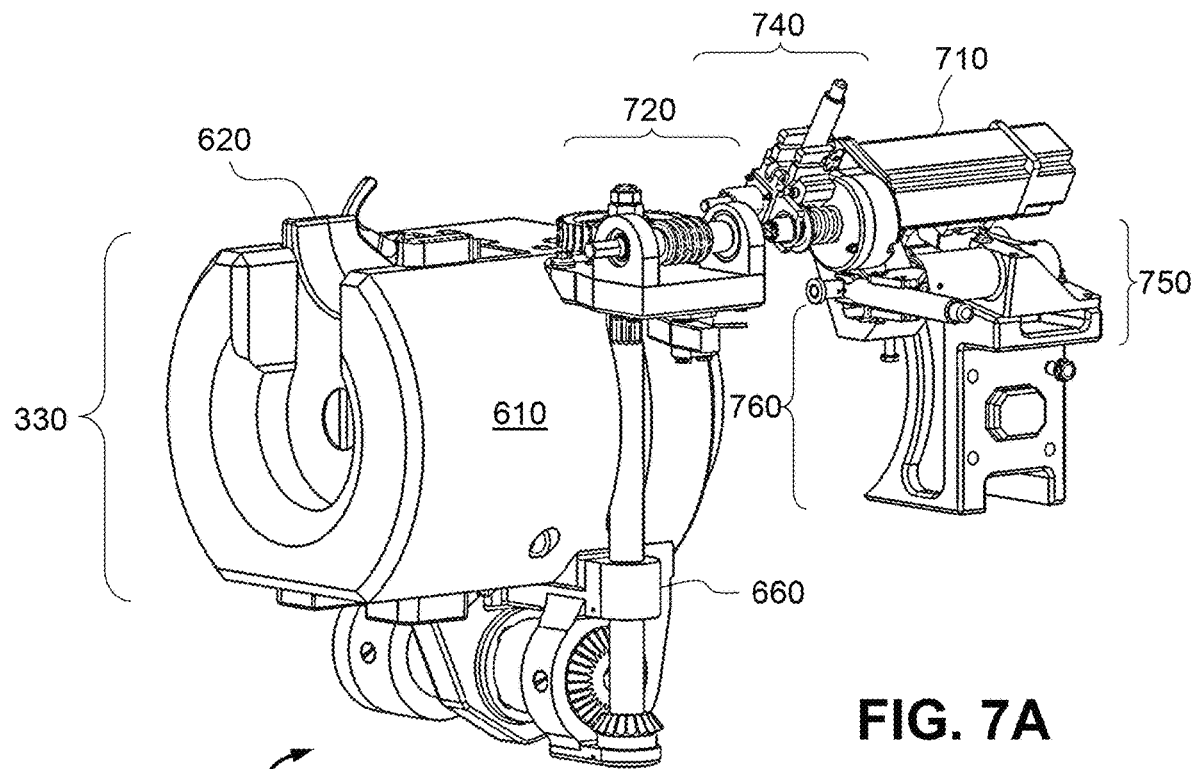
FIGS. 7A and 7B are perspective assembly views of an automated breech.
Figure 7B:
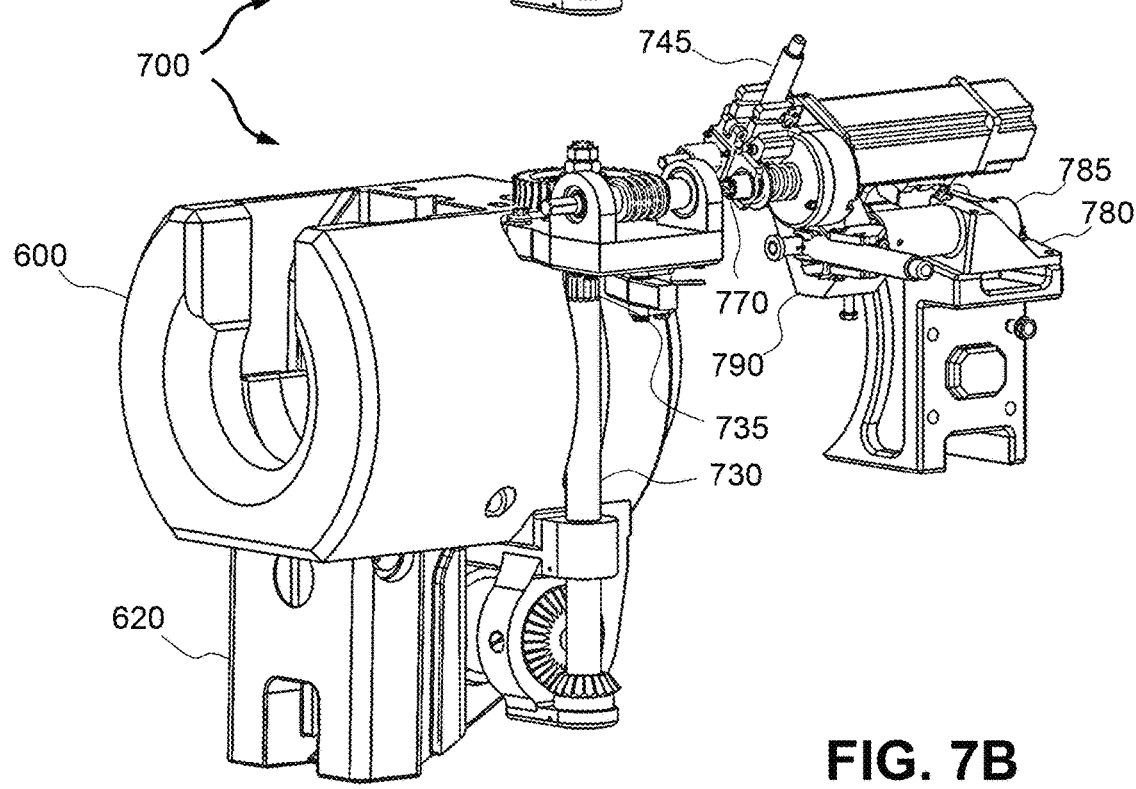

FIGS. 7A and 7B show assembly views 700 of respective closed and open dispositions of the breech 330 under exemplary motorized autoload operation powered by a linear servo motor 710 to raise and lower the seal 620 within the housing 610. A worm gearbox assembly 720 transfers torque from the servo motor 710 to a drive shaft 730 supported by the lower hinge 660. Additional components include a clutch assembly 740 equipped with a release handle 745, a platform 750, a mount cradle 760, a coupler assembly 770, a firing pawl 780 with a transmission 785 and a bracket 790.

Figure 8B:
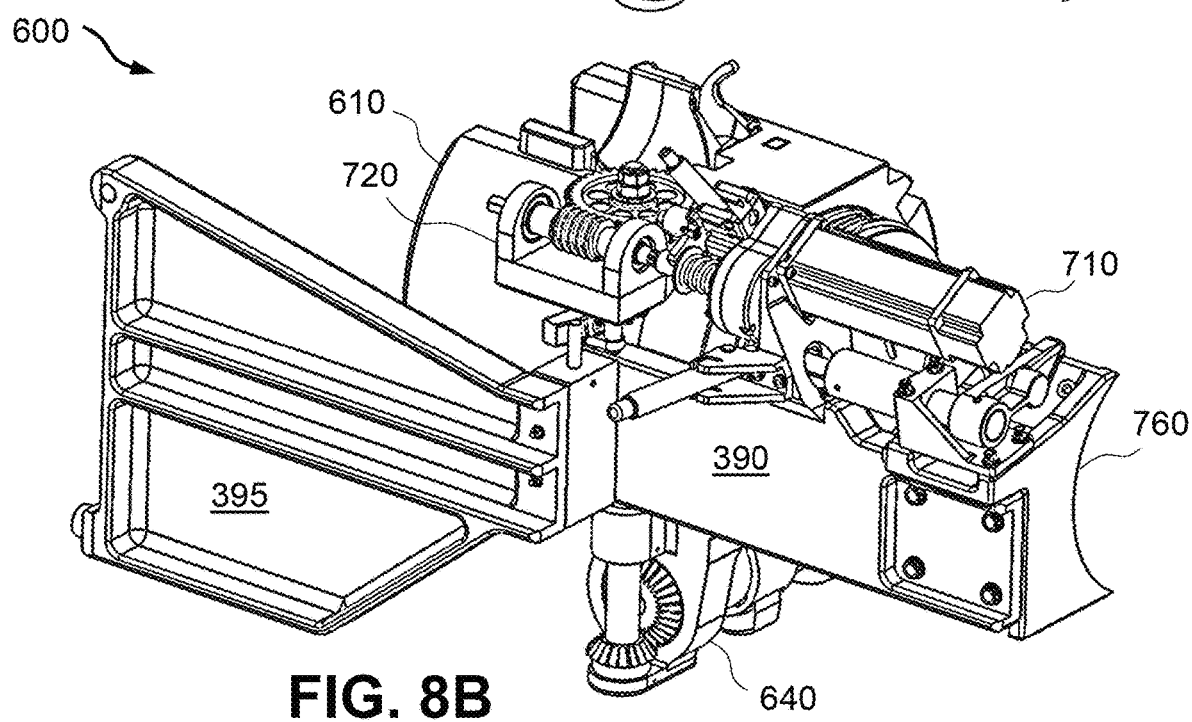
FIGS. 8B, 8C and 8D are isometric assembly views of the breech.
Figure 8A:
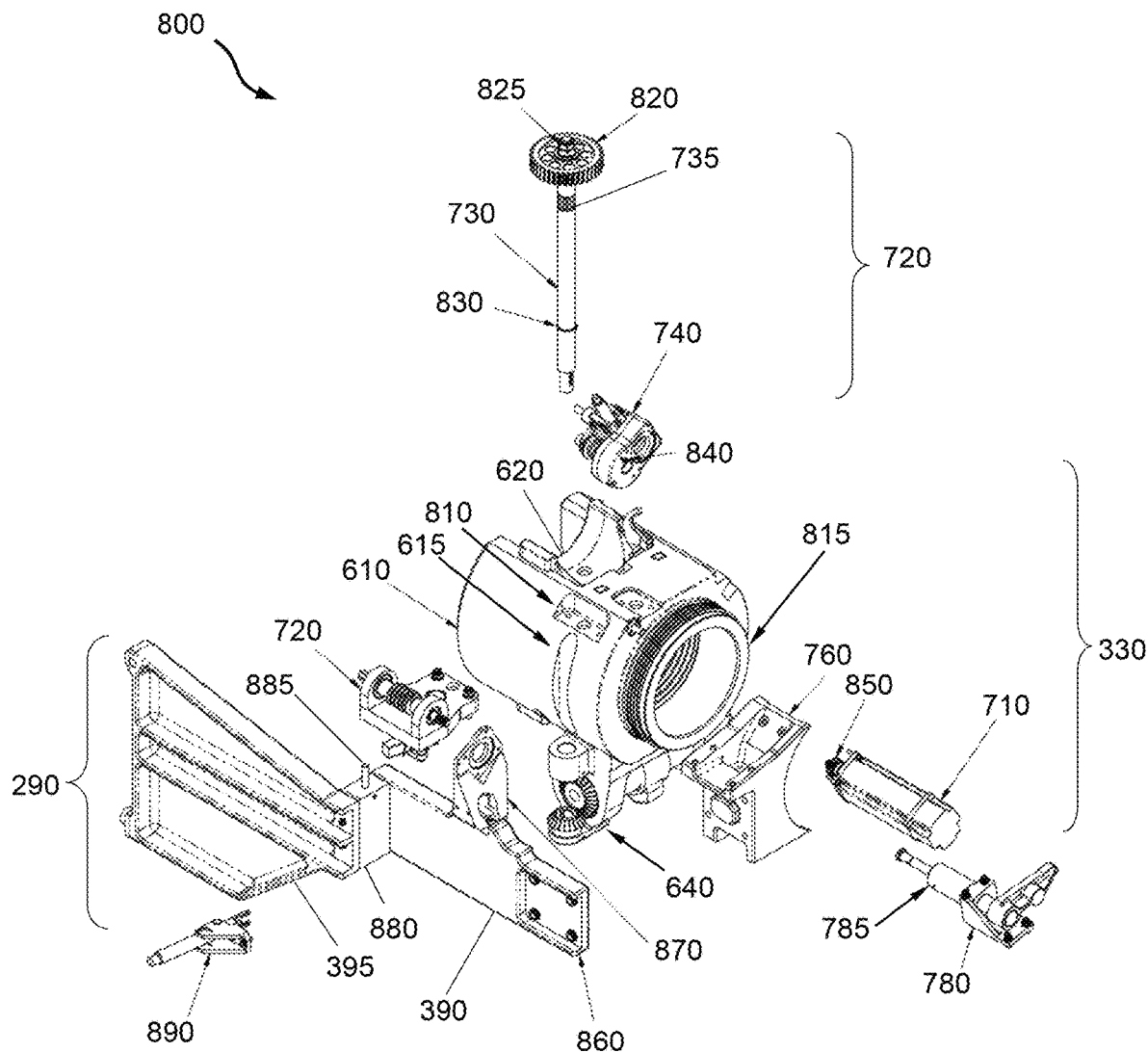
FIG. 8A is an isometric exploded view of the automated breech.
Figure 8C:
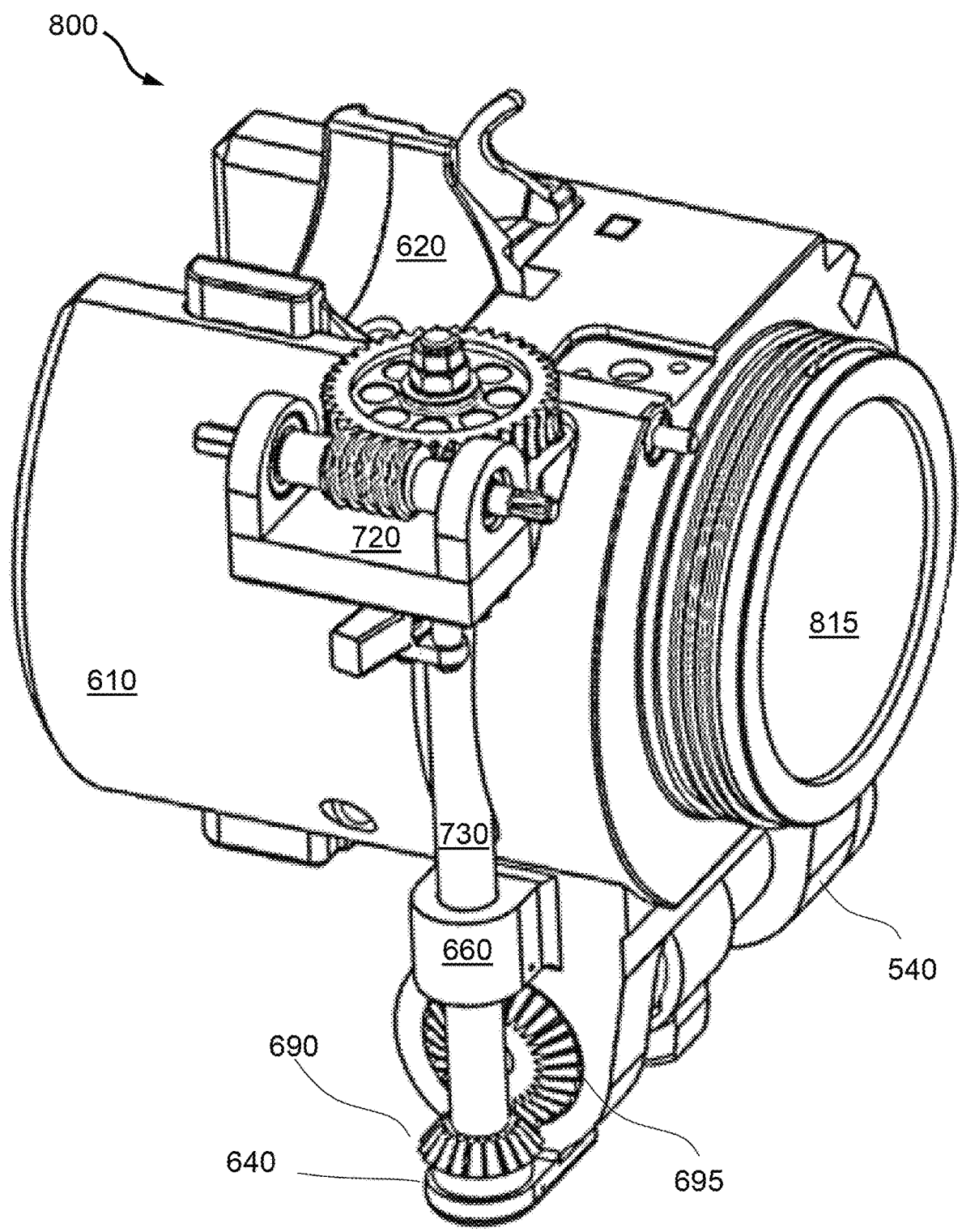
Figure 8D:
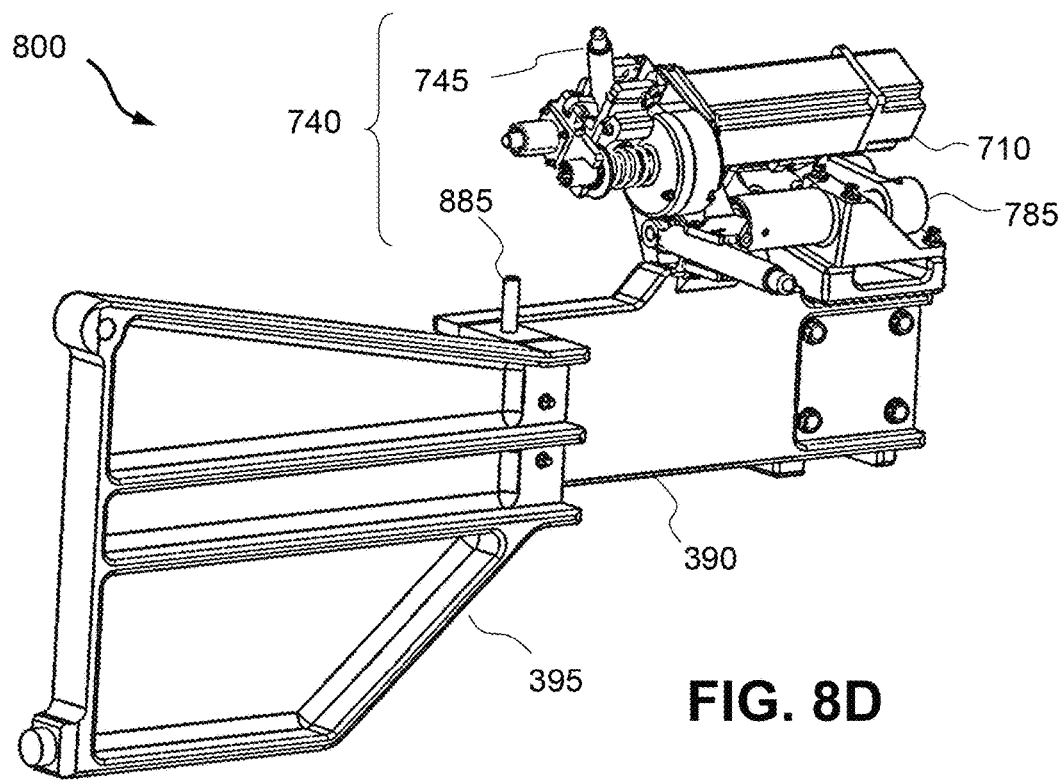

FIG. 8A shows an isometric exploded view 800 of the breech 330 and related motorized components. FIGS. 8B, 8C and 8D show assembly views 800 of the breech 330 and fence 290. The breech 330 includes the housing 610 with the channel slot 615, the seal 620, a shelf 810 for mounting the worm gearbox assembly 720 and a cavity opening 815 with external threads around the circumference.

The gearbox assembly 720 includes a worm wheel 820 secured via a shim nut 825 to the shaft 730, which includes a retaining ring 830. The clutch assembly 740 includes shaft hole 840 for receiving a pinion 850 driven by the servo motor 710.

The mount flange 390 includes a face mount 860 to secure the cradle 760 and an attach flange 870 for securing the clutch assembly 740. The fence 290 includes the cage arm 395 and the mount flange 390 connected together by a block 880 and separable by a release pin 885. Auxiliary components include an override lever 890 and the manual firing pawl 780 with override transmission 785.

The clutch assembly 740 separates the servo motor 710 from the gearbox assembly 720 when the gun 110 fires, thereby pushing the breech 330 aft. Such recoil can damage sensitive components (e.g., the servo motor 710), thereby necessitating clutch engagement to transfer rotational power to the shaft 730 while avoiding translational shock from firing.

Figure 9A:
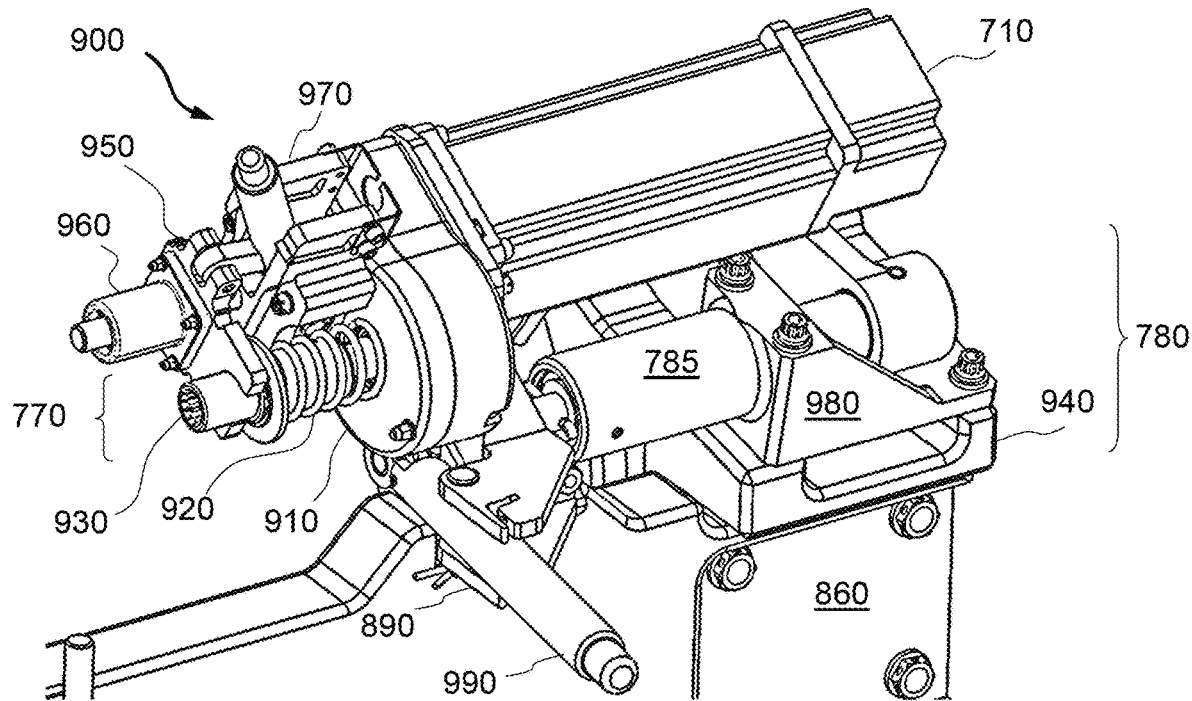
FIGS. 9A, 9B and 9C are perspective detail views of a coupling mechanism.
Figure 9B:
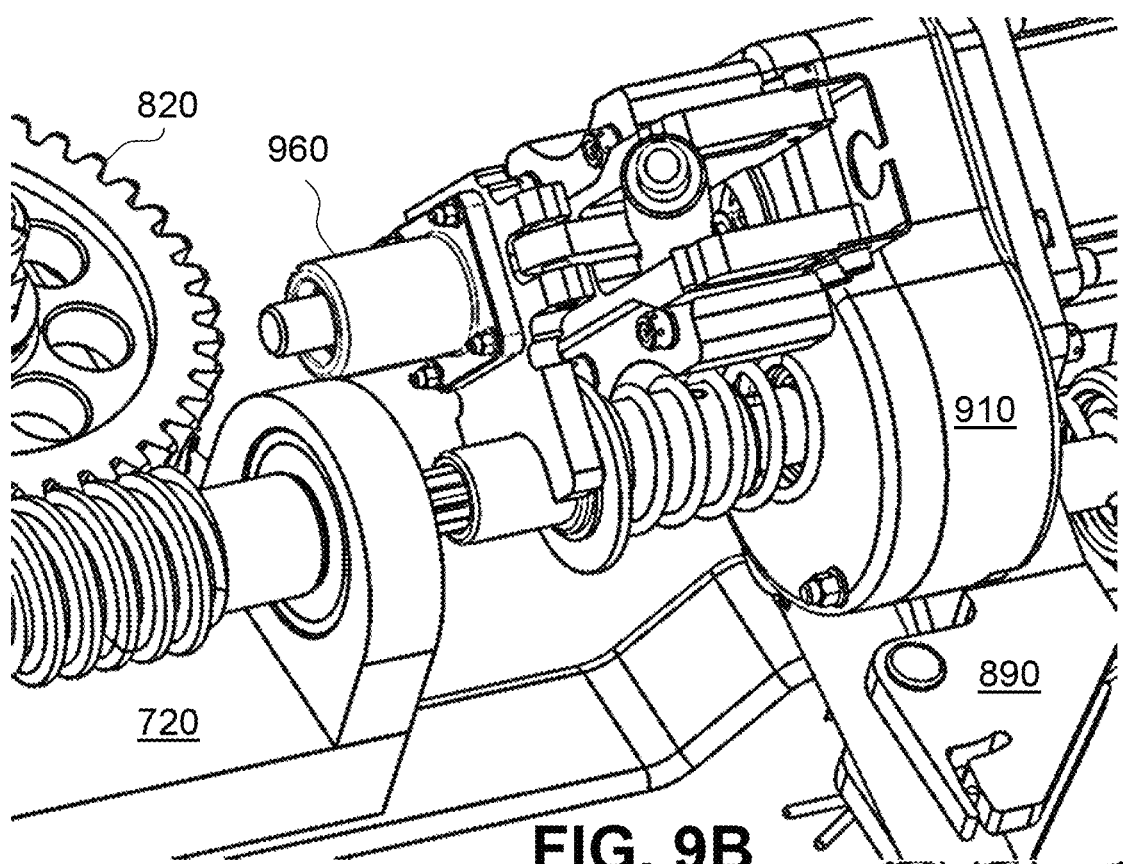
Figure 9C:
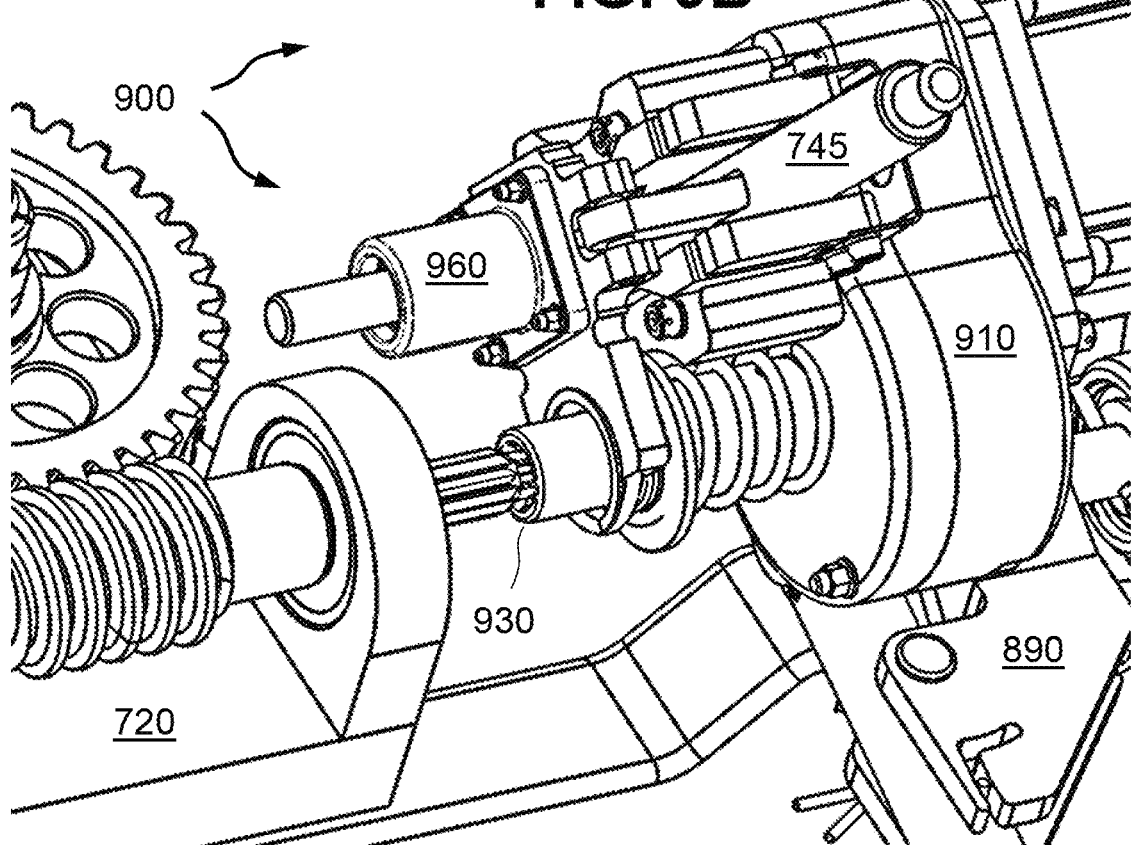

FIGS. 9A, 9B, and 9C show perspective detail views 900 of components for the servo motor 710, the firing pawl 780 and the clutch mechanism 770 that includes a spur gearbox 910, a helical spring 920 and an override coupler 930. In particular, FIG. 9B shows the coupler 930 engaged with the spur gearbox 910, while FIG. 9C shows the coupler 930 disengaged, having moved forward away from the gearbox 910 as the override handle 745 rotates forward.

The coupler 930 is always engaged to the spur gearbox 910, views 700 and 900 show the (dis) engagement of the coupler 930 with the gearbox assembly 720 to enable manual actuation of the breech 330. A platform 940 supports the firing pawl 780 atop the mount flange 390. A fork brace 950 supports a bracket sleeve 960 and attaches to a block hub 970. A cradle 980 atop the platform 940 supports the transmission 785. The lever assembly 890 includes a handle 990. Such manual interfaces 745, 780 and 890 enable personnel to disengage equipment as necessary for operation.

Figure 10A:
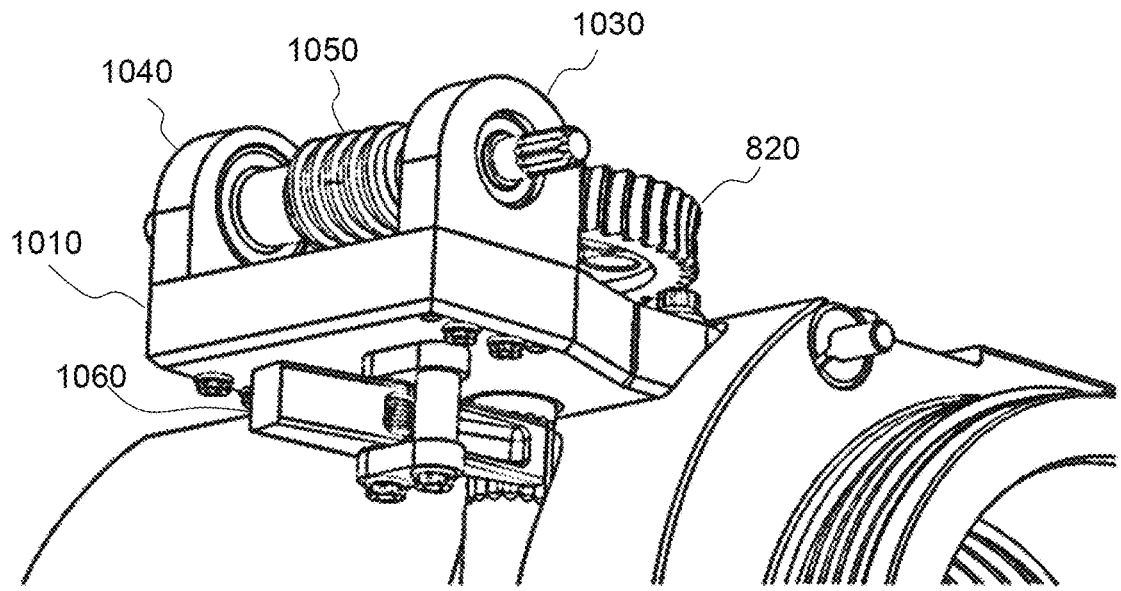
FIGS. 10A and 10B are perspective detail views of a worm gear.
Figure 10B:
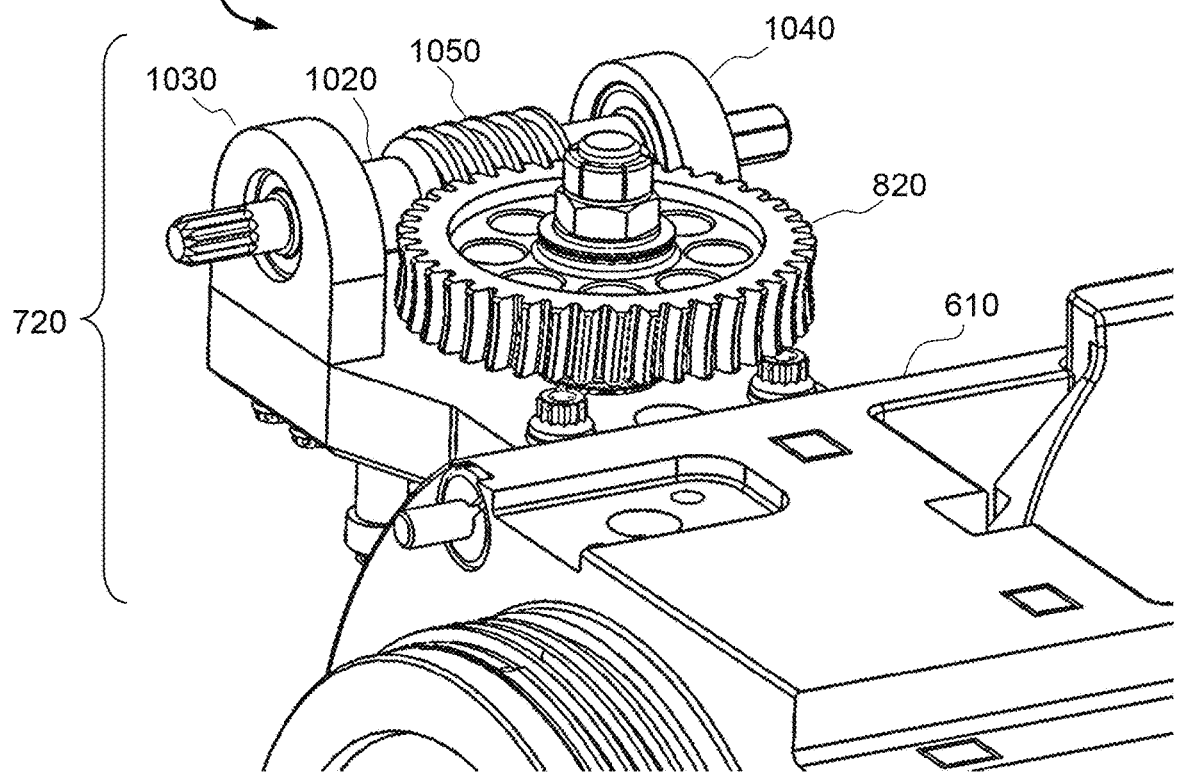

FIGS. 10A and 10B show perspective detail views 1000 of components for the worm gearbox assembly 720. A gearbox plate 1010 attaches to the breech housing 610 at the ledge 810 to form the gearbox structure and support an input gear shaft 1020. A pair of fore and aft trunnions 1030 and 1040. The worm screw 1020 includes a helical thread 1050 that interacts with the worm wheel 820. A spring-loaded pawl clip 1060 secures the drive shaft 730 to the gearbox assembly 720.

Figure 11:
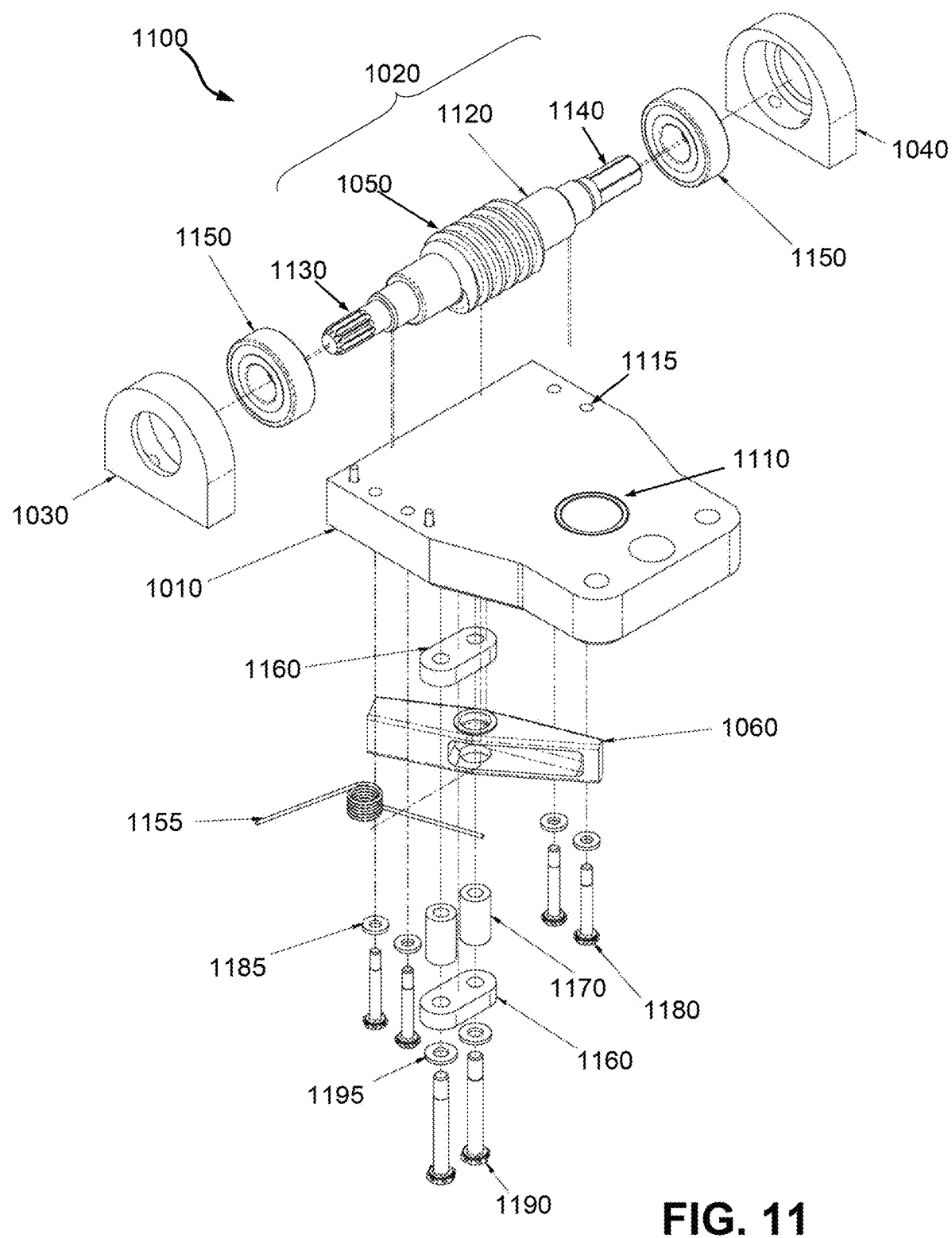
FIG. 11 is an isometric exploded view of the worm gear.

FIG. 11 shows an isometric exploded view 1000 of components for the worm gearbox 720. The plate 1010 includes a crank cavity 1110 for receiving the drive shaft 730 and peripheral mount holes 1115. The worm screw 1020 includes the spiral thread 1050 onto an axial shaft 1120 flanked by fore (proximal) and aft (distal) end splines 1130 and 1140 and supported by bearings 1150 within respective trunnions 1030 and 1040.

The fore spline 1130 engages the coupler 930. The aft spline 1140 provides manual drive input. The components are secured by the pawl clip 1060 together with a torsion spring 1155, links 1160, sleeve spacers 1170, short bolts 1180 and corresponding washers 1185, and long bolts 1190 and their washers 1195. The torsion spring 1155 imposes tension to the pawl clip 1060 and the grooves 735 of the shaft 730.

The pin 885 acts to flip the pawl clip 1060, which locks against ratchet grooves 735 of the drive shaft 730. When the breech 330 is fully forward to be loaded the pin 885 holds the firing pawl 780 open and frees the shaft 730. When the gun 110 recoils, the pin 885 releases the pawl 780. The spring 920 forces the pawl 780 to engage the grooves 735 on the shaft 730 to prevent inadvertent opening of the breech 330.

Figure 12:
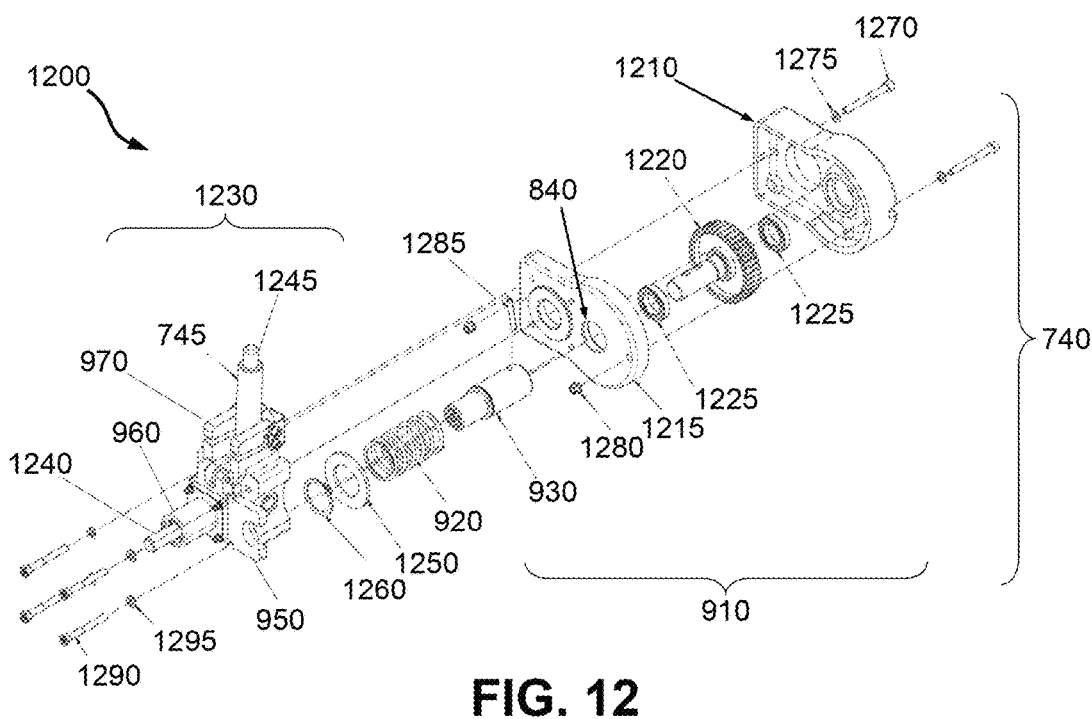
FIG. 12 is an isometric exploded view of clutch components.

FIG. 12 shows an isometric exploded view 1200 of the clutch assembly 740. The spur gearbox 910 includes gear housing 1210 and cover 1215 with hole 840. These contain a coupler gear 1220 flanked by bearings 1225. The brace 950, sleeve 960 and hub 970 comprise a load assembly 1230. The sleeve 960 houses a shaft 1240. The flange 950 attaches to the block hub 970 that receives the lever 745, coupler 930, compression spring 920, drive shaft 1240, release button 1245, washer 1250 and retainer ring 1260.

These components are secured by #1640-32 screws 1270, washers 1275 and self-lock nuts 1280, along with pin 1285 and #1640-32 screw 1290 and washer 1295. As the lever 745 pitches, the spring 920 compresses causing the coupler 930 and gear 1220 to withdraw from the fore spline 1130 of the worm gearbox 720. The coupler gear 1220 turns the coupler 930 to release the sleeve 960 as the spring 920 applies tension between the brace 950 and the gearbox 910.

Figure 13:
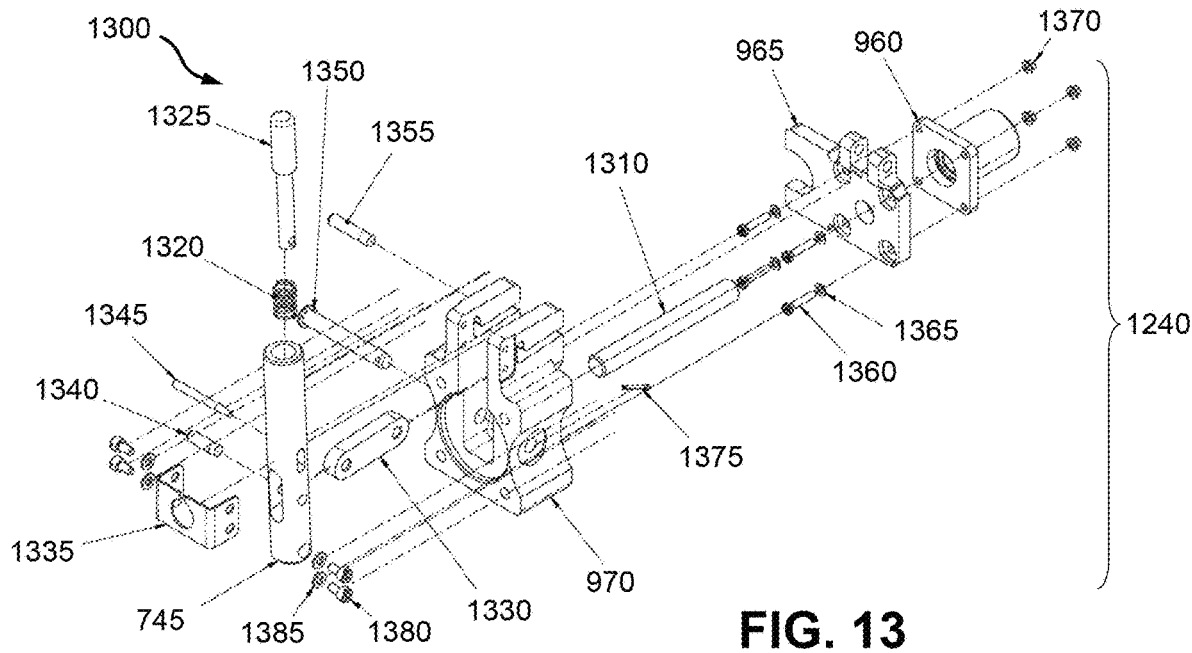
FIG. 13 is an isometric exploded view of coupler components.

FIG. 13 shows an isometric exploded view 1300 of the manual lever 1325. Components include pivot hub 970, shaft 1310, actuating fork 950, bracket sleeve 960, handle 745, compression spring 1320, plunger 1345, bracket 1335, linkage 1330, pin 1350, dowel 1355, hex screw 1360, hex screw 1365, nut 1370, cotter pin 1375, cap screw 1380, washer 1385, dowel 1340, dowel 1345. Pivoting the handle 745 on the hub 970, operates the actuating fork 950 on the shaft 730.

This assembly is used in conjunction with the spring loaded coupler 930 to disengage the motor 710 from the gearbox assembly 720 in the event the operator needs to manually actuate the breech 330. While engaged. the motor brake locks the coupler 930 from rotating to prevent manually turning the worm screw 1050 via the hex spline end 1140.

Figure 14:
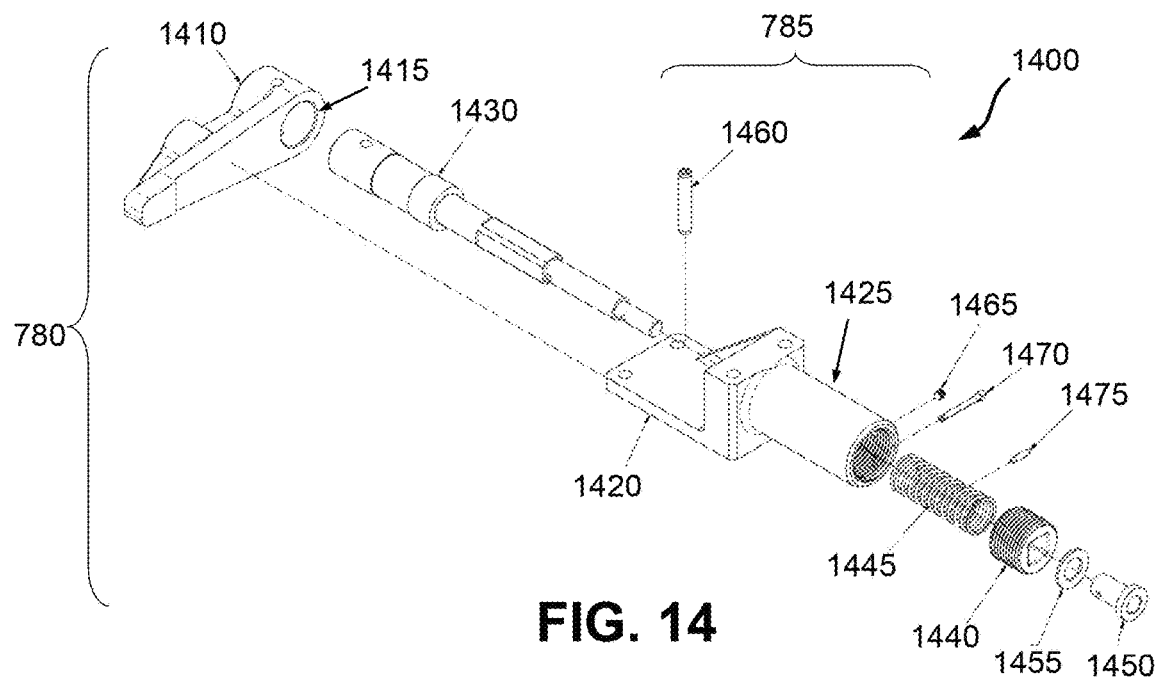
FIG. 14 is an isometric exploded view of the firing pawl.

FIG. 14 shows an isometric exploded view 1400 of firing pawl 780. Components include grip 1410, shaft hole 1415, bracket 1420, female threaded tube 1425, shaft 1430, male threaded follower 1440, helical spring 1445, shaft adapter 1450, washer 1455, slot spring 1460, set screw 1465, cotter pin 1470, dowel 1475. The transmission 785 comprises the bracket 1420 and the tube 1425.

As the grip 1410 turns the shaft 1430, this assembly actuates by an electric solenoid (not shown) that pushes the grip 1410 into the transfer cam 540 on the breech 330 to fire the gun 110. The shaft 1430 facilitates smooth operation to prevent binding and provide a manual override location in the event of power failure with the adapter 1450. The spring 1445 returns the grip 1410 and transfer cam 540 to the ready fire position after actuation.

Figure 15:
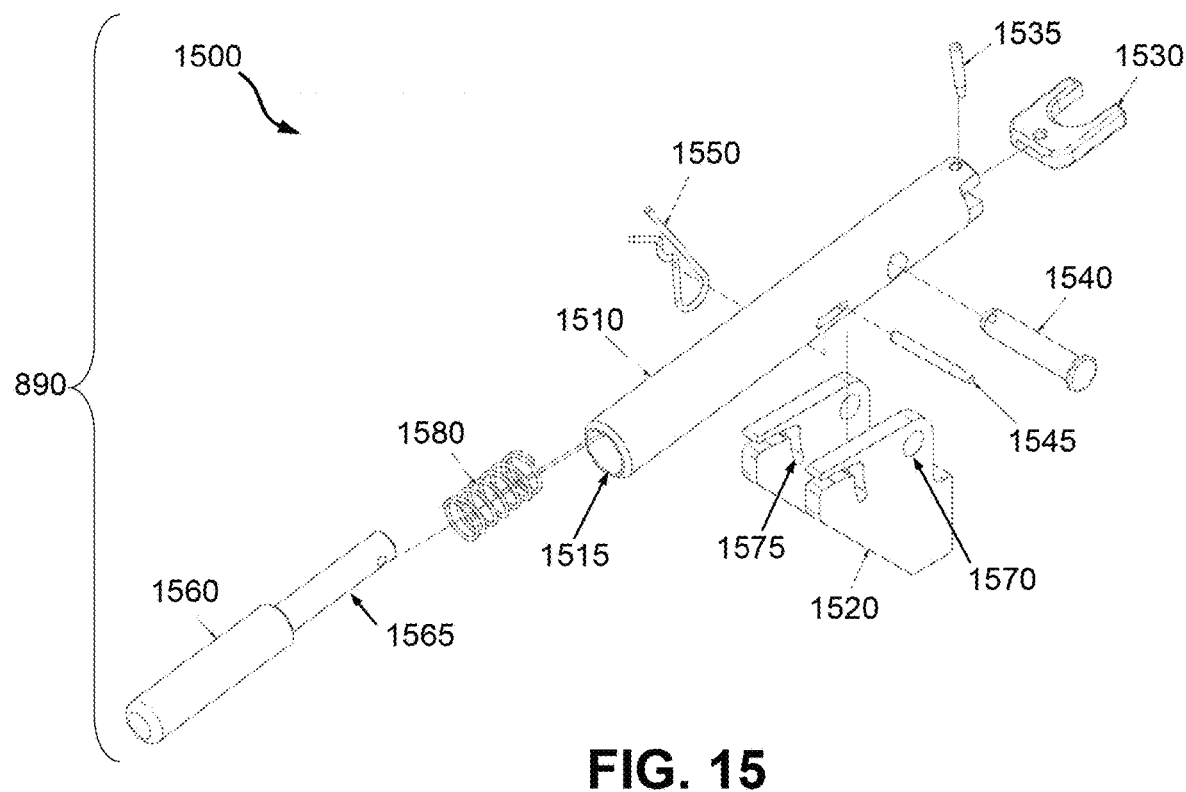
FIG. 15 is an isometric exploded view of the manual firing lever.

FIG. 15 shows an isometric exploded view 1500 of the manual lever 890. Components include lever arm 1510, pivot 1520, actuating fork 1530, 1535 dowel, 1540 pin, 1545 pin, cotter pin 1550, 1560 plunger, hole 1570, compression spring 1580. This assembly engages with the shaft adapter 1450 of the firing pawl 780. During normal remote operation the shaft adapter 1450 is free to actuate inside the fork 1530 without engaging the lever 890.

In the event of power or solenoid failure, the gun 110 can be fired by depressing the plunger 1560 and pivoting the lever 890. This causes the fork 1530 to engage the shaft adapter 1450, which pulls the firing pawl shaft 1430 connected to the grip 1410 to simulate the solenoid motion and fire the gun 110.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A remote operated mechanism for raising and lowering a seal in a gun loader breech via a transfer gear, said mechanism comprising:
   a servo motor for axially rotating a pinion;
   a clutch for controllably engaging and disengaging with said pinion; and
   a worm gear for coupling said clutch to a shaft that turns the transfer gear, wherein
   said clutch disengages said pinion from said motor in response to recoil from firing the gun.

2. The mechanism according to claim 1, wherein said worm gear further includes:
   a worm screw that axially turns with said pinion; and
   a worm wheel that engages said worm screw to laterally spin said shaft.

3. The mechanism according to claim 2, wherein said worm screw mounts to a support platform that sets on a shelf on the breech.

4. The mechanism according to claim 2, wherein said clutch includes:
- a coupler for engaging said worm screw;
- a spur gear that connects said coupler to said pinion; and
- a spring that pushes said coupler to engage said worm screw.

5. The mechanism according to claim 1, wherein said motor and said clutch mount to a fence arm that connects to the gun.

\* \* \* \* \*